(No Model.)
B. W. ALM.
AIR PUMP FOR VELOCIPEDES.
No. 583,015. Patented May 25, 1897.
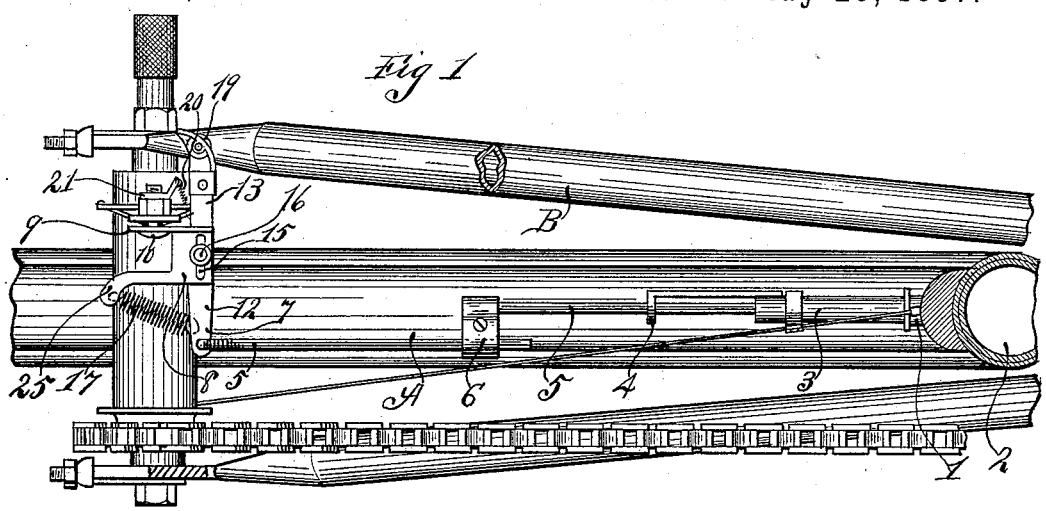
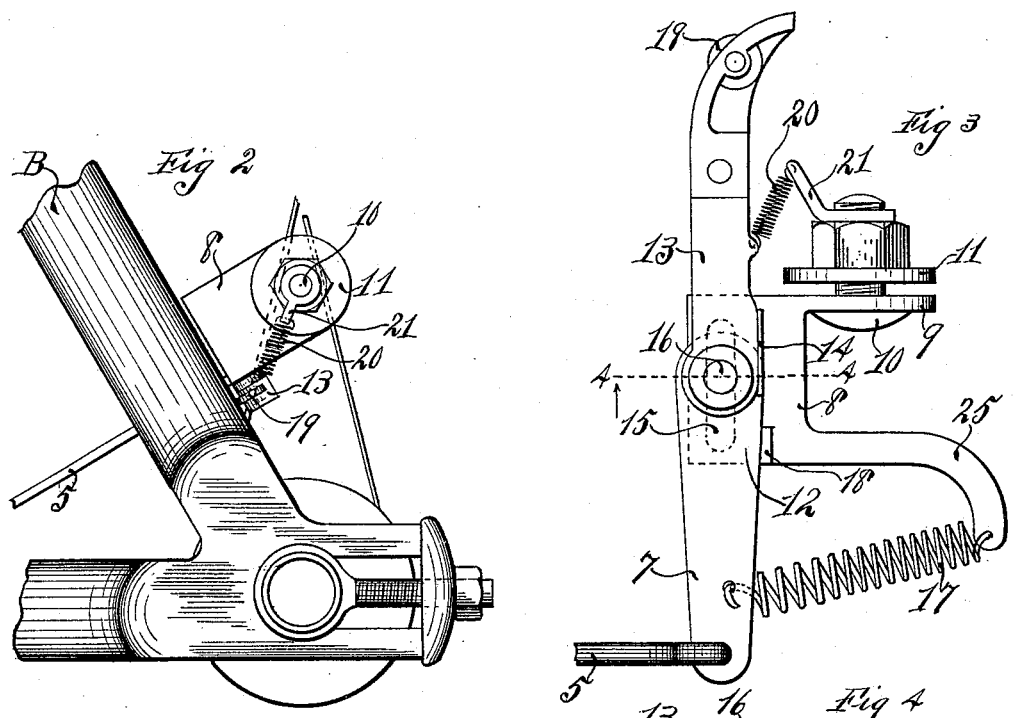
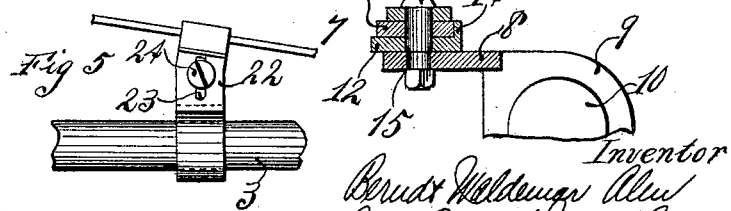
Witnesses
W. C. Coolies
C. A. Crawford
Inventor
Berndt Waldemar Alm
By Rudolph Wm. Lotz
Attorney
THE NORRIS PETERS CO., PHOTO-LITHO., WASHINGTON, D. C.

UNITED STATES PATENT OFFICE.

BERNDT WALDEMAR ALM, OF ROSELAND, ILLINOIS.

AIR-PUMP FOR VELOCIPEDES.

SPECIFICATION forming part of Letters Patent No. 583,015, dated May 25, 1897.

Application filed July 13, 1896. Serial No. 599,044. (No model.)

*To all whom it may concern:*

Be it known that I, BERNDT WALDEMAR ALM, a citizen of the United States, residing at Roseland, in the county of Cook and State of Illinois, have invented certain new and useful Improvements in Velocipede Air-Pumps; and I do hereby declare the following to be a full, clear, and exact description of the invention, such as will enable others skilled in the art to which it appertains to make and use the same.

My invention relates to a novel construction in a velocipede air-pump, the object being to provide a device of this description which will be operated by the motion of the wheels; and it consists in the features of construction and combinations of parts hereinafter fully described and claimed.

In the accompanying drawings, illustrating my invention, Figure 1 is a partial sectional view of a bicycle-wheel provided with an air-pump constructed in accordance with my invention. Fig. 2 is a partial side elevation of the same. Fig. 3 is a detail view in elevation of the devices operating the pump. Fig. 4 is a sectional view on the line 4 4 of Fig. 3. Fig. 5 is a view in elevation of the clamp for holding the pump firmly in position.

Referring now to said drawings, A indicates the wheel, and B the fork, of a bicycle. The stem 1 of the tire 2 passes through the rim of the wheel A, and the pump 3 is mounted thereon. Said pump 3 is provided with a guide 4, in which the piston-rod 5 moves. Said piston-rod 5 consists of two members secured together by means of a removable clamp 6 to enable the adjustment of said piston-rod in accordance with the radius of the wheel. At its upper end said piston-rod is pivotally connected with a lever 7, pivotally mounted upon the flange 8 of a plate 9, carrying a bolt 10, by means of which it is secured to the spokes of the wheel. A washer 11 is preferably inserted between the nut of said bolt 10 and the spokes for obvious reasons. Said lever 7 consists, preferably, of two members 12 and 13, which are pivotally mounted with relation to each other. Said member 12 is provided with a flange 14, which is adapted to engage the member 13 to limit the relative movements of said members with relation to each other in one direction and cause them to move in unison in that direction as soon as said member 13 engages said shoulder 14. Said flange 8 of said plate 9 is provided with a slot 15, through which the pivot-bolt 16 passes, upon which said members of said lever 7 are pivotally mounted to permit the adjustment of the position of said lever with relation to the fork. Said member 12 of said lever is connected with said piston-rod 5 and is connected with an arm 25 on said flange 8 by means of a spiral spring 17, which is adapted to hold said member normally at the inner limit of its movement and in engagement with the lug 18 on said flange 8. Said member 12 is provided at its outer end with an antifriction-roller 19, which is adapted to be engaged by the fork B during the revolution of the wheel to turn both members of said lever on their pivot and force the piston-rod outwardly, thus causing the compression of the air in the pump. After said antifriction-roller has passed a member of the fork the spring 17 will cause said lever to move back to the inner limit of its movement and the piston of the pump to make its return stroke. Thus for each revolution of the front wheel of the bicycle the pump will make one stroke and for each revolution of the rear wheel of the bicycle the pump will make two strokes.

To permit the wheels of the bicycle to reverse their movement while the member 13 of the lever is set to engage the fork, I have provided a spring 20, which is connected at one end with said member 13 and at its other end with an arm on a plate 21, mounted on the bolt 10 in front of the nut. As the pivotal connection between the members 12 and 13 permits the rotation of the member 13 with relation to the member 12 in the direction caused by reversing the movement of the wheels, the said spring 20 will serve to cause said member 13 to return to its engagement with the shoulder 14 on said member 12 after its engagement with the fork during such reverse movement of the wheels.

When it is desired that the pump shall not operate, the member 13 is turned against the action of said spring 20 until said spring has passed the bolt 15, when it serves to hold said member in this position, as will be obvious. In this manner the member 13 is thrown out of engagement with the fork and will permit the free rotation of the wheels. In order to hold said pump rigidly in position with relation to the spokes, I have provided an adjustable clip 22, one member of which is secured to the pump 3 and the other member of which is secured to an adjacent spoke. Owing to the various distances between the spokes of various makes of bicycles and the different positions of the stem of the tire with relation to the spokes, it is necessary that this clip be adjustable in length, and to this end I have provided longitudinal slots 23 in both members thereof, through which the bolt 24, by means of which they are secured together, passes. The said plate 9 is secured to the spokes of the wheel a few inches from the center on a radial line practically at right angles to the radial line passing through the pump for obvious reasons.

By means of my device the necessity of the rider dismounting to inflate his tires is obviated, and it has also the advantage that it will constantly keep the tire inflated against a slow puncture. It is also simple, durable, and light.

I claim as my invention—

1. In a velocipede air-pump, a pump provided with a piston having a piston-rod connected at its other end with a lever comprising two parts revoluble with relation to each other in one direction and rigid against relative rotation in the opposite direction, pivotally mounted upon a clip secured to the spokes of the wheel and adapted to engage a rigid portion of the frame to compress the air in said pump, and a spring connected with said lever for holding the same normally in position so that the piston of said pump will be at the inner limit of its movement.

2. In a velocipede air-pump, a pump provided with a piston having a piston-rod connected at its other end with a lever pivotally mounted upon a clip secured to the spokes of the wheel, said lever consisting of two members movable with relation to each other in one direction, one of said members being connected with said piston-rod of said pump and with a spring, and the other of said members being adapted to engage a rigid portion of the frame and said other member to turn the latter against the action of said spring to operate said pump.

3. In a velocipede air-pump, a lever pivotally mounted upon a clip secured to the spokes of the wheel and comprising two members movable with relation to each other, a shoulder on one of said members adapted to engage the other of said members, connection between one of said members and the pump and between said member and a spring, said other member being adapted to engage a rigid portion of the frame, to turn said other member against the action of said spring to operate said pump, and connection between said member and a spring for holding it normally in engagement with said shoulder on said other member.

In testimony whereof I affix my signature in presence of two witnesses.

BERNDT WALDEMAR ALM.

Witnesses:
RUDOLPH WM. LOTZ,
E. J. BOILEAU.